US006714970B1

United States Patent
Fiveash et al.

(10) Patent No.: US 6,714,970 B1
(45) Date of Patent: Mar. 30, 2004

(54) PROTECTING OPEN WORLD WIDE WEB SITES FROM KNOWN MALICIOUS USERS BY DIVERTING REQUESTS FROM MALICIOUS USERS TO ALIAS ADDRESSES FOR THE PROTECTED SITES

(75) Inventors: William Alton Fiveash, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 09/697,443

(22) Filed: Oct. 26, 2000

(51) Int. Cl.[7] ................................. G06F 15/16
(52) U.S. Cl. ................ 709/219; 709/225; 709/229; 713/201
(58) Field of Search ................. 709/219, 225, 709/229; 713/200, 201

(56) References Cited

U.S. PATENT DOCUMENTS

| | | | | |
|---|---|---|---|---|
| 6,112,239 A | * | 8/2000 | Kenner et al. | 709/224 |
| 6,363,489 B1 | * | 3/2002 | Comay et al. | 713/201 |
| 6,408,391 B1 | * | 6/2002 | Huff et al. | 713/201 |
| 6,442,696 B1 | * | 8/2002 | Wray et al. | 713/201 |
| 6,493,752 B1 | * | 12/2002 | Lee et al. | 709/223 |
| 6,578,147 B1 | * | 6/2003 | Shanklin et al. | 713/200 |

OTHER PUBLICATIONS

SC Magazine, "Intrusion Detection," Jun. 2000, from http://www.scmagazine.com/scmagazine.com/scmagazine/2000_06/testc/prod1.html, printout pp. 1–11.*
Brenton, "Honeynets," Oct. 16, 2000, from www.ists.dartmouth.edu/IRIA/knowledge_base/honeynets.pdf, pp. 1–8.*
Spitzner, "To Build a Honeypot," Jun. 7, 2000, from http://newdata.box.sk/2000a/papers/honeypot.html, printout pp. 1–5.*
Greenblatt, "CyberCop Protects Your Network," Dec. 1997, Datamation, vol. 44, Issue 1 pp. 22–24.*

* cited by examiner

Primary Examiner—Dung C. Dinh
Assistant Examiner—Bradley Edelman
(74) Attorney, Agent, or Firm—Jerry B. Kraft; Valel Emile

(57) ABSTRACT

Protecting open Web sites from known malicious users in a World Wide Web (Web) communication network with access to a plurality of open Web sites responsive to requests from users at IP addresses throughout the Web. There is provided in association with a protected open Web site, a stored list of the IP addresses of known malicious users combined with means for comparing the IP addresses of each user requesting access to the protected open Web site to said list of IP addresses of the known malicious users. There are also implementations responsive to the comparing means for diverting to an alias address for the protected Web site any request from the IP address of a malicious user. The alias address is provided by a function associated with the protected open Web site. The present invention is applicable in circumstances where the malicious users or "crackers" are already known.

13 Claims, 4 Drawing Sheets

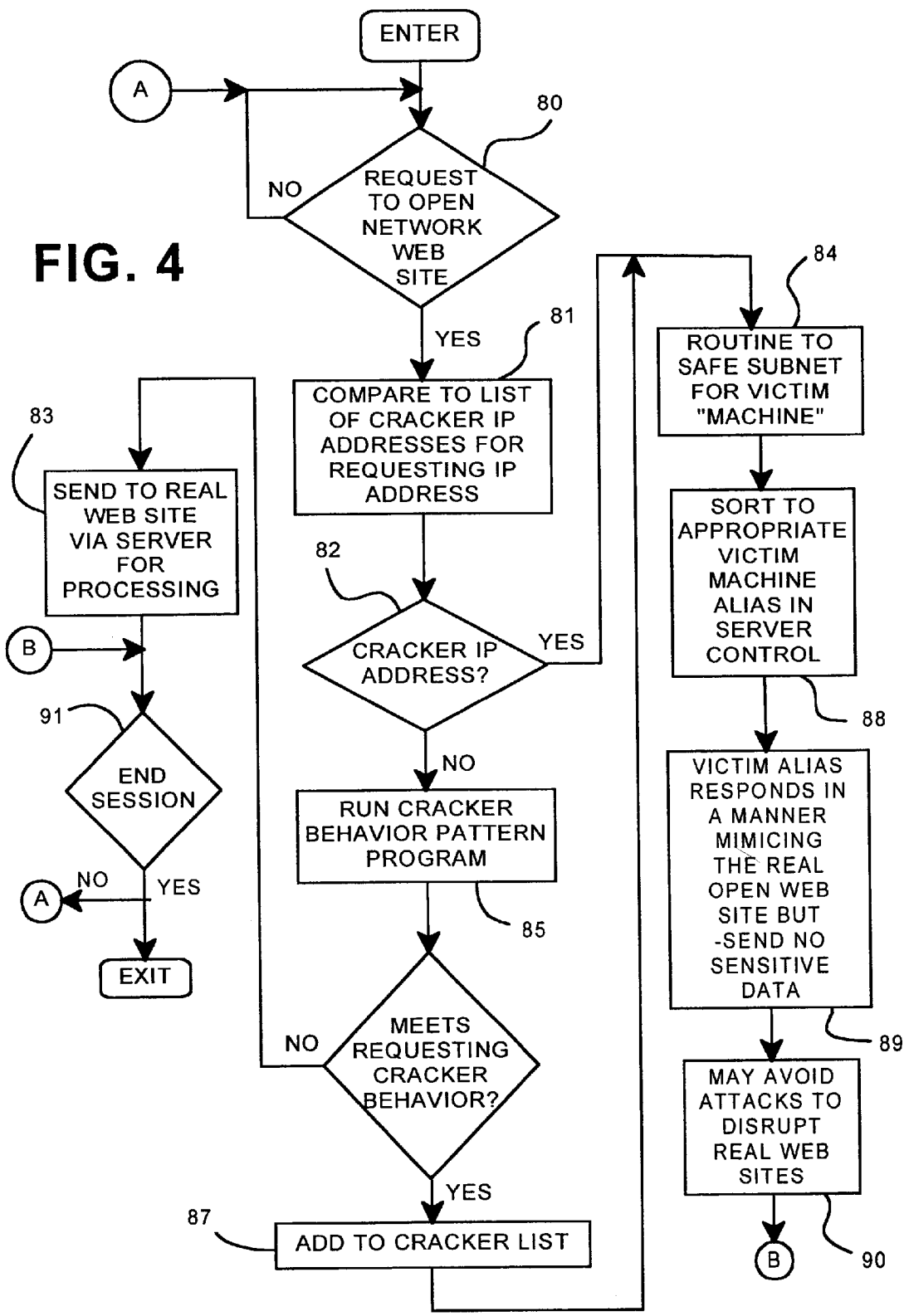

PROTECTING OPEN WORLD WIDE WEB SITES FROM KNOWN MALICIOUS USERS BY DIVERTING REQUESTS FROM MALICIOUS USERS TO ALIAS ADDRESSES FOR THE PROTECTED SITES

TECHNICAL FIELD

The present invention relates to computer managed communication networks such as the World Wide Web (Web) and, particularly, to the protection of open Web sites from requests by malicious users.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In order for the Web to reach its full potential as the basic channel for all world wide business and academic transactions and communications, the providers and users of the Web and like networks must be assured an open communication environment, as well as protection of the data that is offered over the Web and the requests made for such data.

With the rise of the Web, there has been an unfortunate increase in the number of malicious users who at the least try to disrupt Web and other network services and at their worst try to steal goods, services and data accessible over the Web. Of course, the industry has been working for many years to eliminate, or at least neutralize, the efforts of such malicious users. These malicious users have, in recent times, been referred to as "crackers", to distinguish them from "hackers" who may operate extensively but for benevolent or at least harmless reasons. Conventionally, the industry has tried to limit access to Web site resources by such crackers through security devices such as fire-wall access passwords. However, these devices often irritate and confuse the vast groups of new people using the Web who have little or no computer sophistication. In order for the Web to reach its full potential, it will be necessary to make Web sites offering goods, services or data as open and as easy to access as possible.

SUMMARY OF THE PRESENT INVENTION

The present invention provides a system, method and program for protecting said open Web sites from known malicious users in a Web communication network with access to a plurality of open Web sites responsive to requests from users at IP addresses throughout the Web. There is provided means associated with a protected open Web site for storing a list of the IP addresses of such known malicious users combined with means for comparing the IP addresses of each user requesting access to the protected open Web site to said list of IP addresses of said known malicious users. There are also means responsive to the comparing means for diverting to an alias address for said protected Web site any request from the IP address of a malicious user. The alias address is provided by means associated with the protected open Web site.

The present invention is applicable in circumstances where the malicious users or crackers are already known. This is not unusual since once such users do damage to a particular Web site, their sources, i.e. IP addresses, become apparent and the Web industry is alerted to such rogue IP addresses. Thus, in dealing with a request from any known malicious user, the object is to not tip off the user that the site under assault is taking protective measures. Thus, if the inquiry were met with a rejection or denial of service, then the rogue user could readily alias to another requesting user alias address and continue his attack on the site. With the present diversion to an alias Web site address, all the rogue or cracker would note would be a brief blip, interruption or delay in the service of his request. This would be not unlike any conventional delay interruption that anyone accessing a Web site could experience, rather than a denial in service.

In accordance with another aspect of the present invention, there is provided a plurality of alias addresses rather than a single alias address. With such a plurality of alias addresses, the means for diverting are enabled to respectively divert to each of the plurality of alias addresses, one of a plurality of requests respectively from a corresponding one of a plurality of IP addresses of a plurality of malicious users, whereby the request of each of the malicious users is diverted to a different one of said alias Web site addresses. In this manner, each different requesting malicious user or cracker is individually isolated so that each different requesting user may be individually dealt with.

In addition, the system/method may be set up so that the means associated with the protected open Web site for storing a list of the IP addresses of said known malicious users is associated with a plurality of protected Web sites, i.e. the group of Web sites may share the list storing means as well as the comparing means.

In accordance with a more particular aspect of the present invention, the network system has a server for the protected Web site which includes the means for comparing, the means for providing the alias address and the means for diverting. Also, the means for diverting may further include a router for routing all requests from the malicious users to a safe sub-network at said alias address.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 4 is a flowchart of an illustrative run of the program set up in FIG. 3.

DETAILED DESCRIPTION OF THE PREFERRED EMBODIMENT

Figure 1:
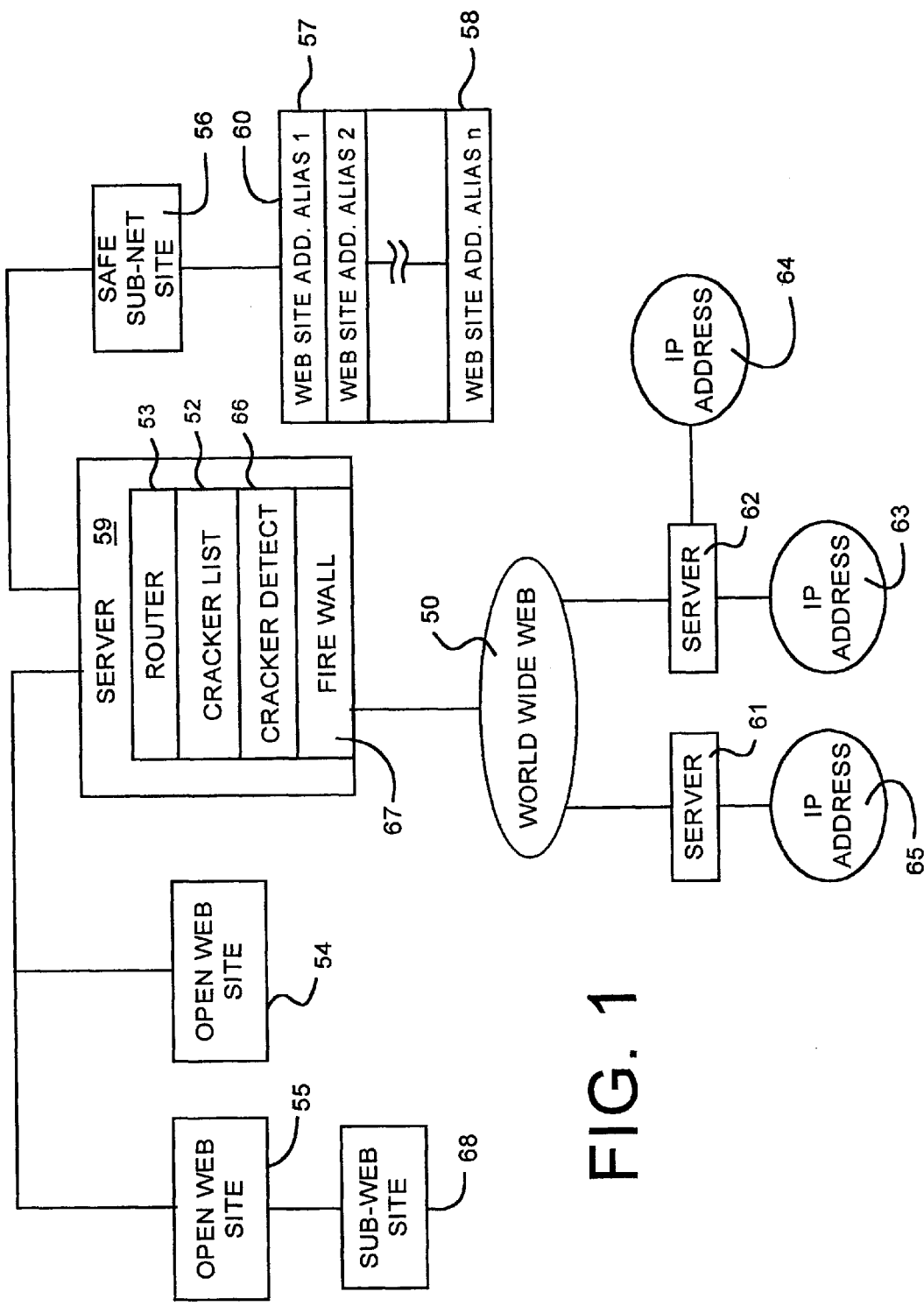
FIG. 1 is a generalized diagrammatic view of a Web portion showing how an open Web site may be accessed by and protected from malicious requesting users.

Referring to FIG. 1, there is provided a generalized view of a network, such as the Web or Internet (used interchangeably herein), showing illustrative open Web sites 54 and 55, as well as some IP addresses 63, 64 and 65 from which malicious, rogue users or crackers may be making requests for access to the Web sites. The open Web sites are connected to the Web communication network through servers such as server 51 to move data to and from the Web 50. Likewise, users at various IP addresses are connected to Web 50 via servers 61 and 62. Accessing Web sites is done using conventional TCP/IP protocols using IP addressing. This is described in detail in the text, *Using Networks*, Frank J. Derfler, 1998, Que Div. of Macmillan Computer Publishing, Indianapolis, Ind.

Thus, every user originating a request will have an IP address. When malicious users have been attacking various Web sites, this information may now be readily disseminated over the Web so that other open Web sites may be on guard against such attacks. The conventional Web site protection approach has been for Web sites to deny access to requests from the IP addresses of malicious users. Of course, this alerts the user that the target Web site is aware of the rogue user IP address and gives the malicious user the opportunity to alias to another user address and resume the attack.

In the present invention, the server 51, which serves a group of open Web sites 54 and 55, also has stored in association with it a list of known cracker or malicious user addresses 52. In normal operations, if the IP address of the requesting user is not on the list, the request is routed to the appropriate Web site through router 53 under the control of server 51. On the other hand, if the user IP address is on the cracker list 52, then the Web site address is aliased without any denial and just the slightest interruption to a "safe" sub-network site 56 where the request is stored. The request is, thus, diverted and, at least temporarily, stored so as to be available for any further analysis. In accordance with a potential variation, the server 51 and router 53 may be set up in the case of several (n) number of crackers on list 52, a different Web site alias may be assigned for each different cracker (1–n) and the respective requests from each different cracker diverted and stored at a different Web site alias 57 through 58. In such a case, requests from different crackers are available for individual tallying and analysis.

The routing of data and requests under Web site server control is discussed in greater detail in the above mentioned text, *Using Networks*, Frank J. Derfler, particularly at pp. 320–328.

Figure 2:
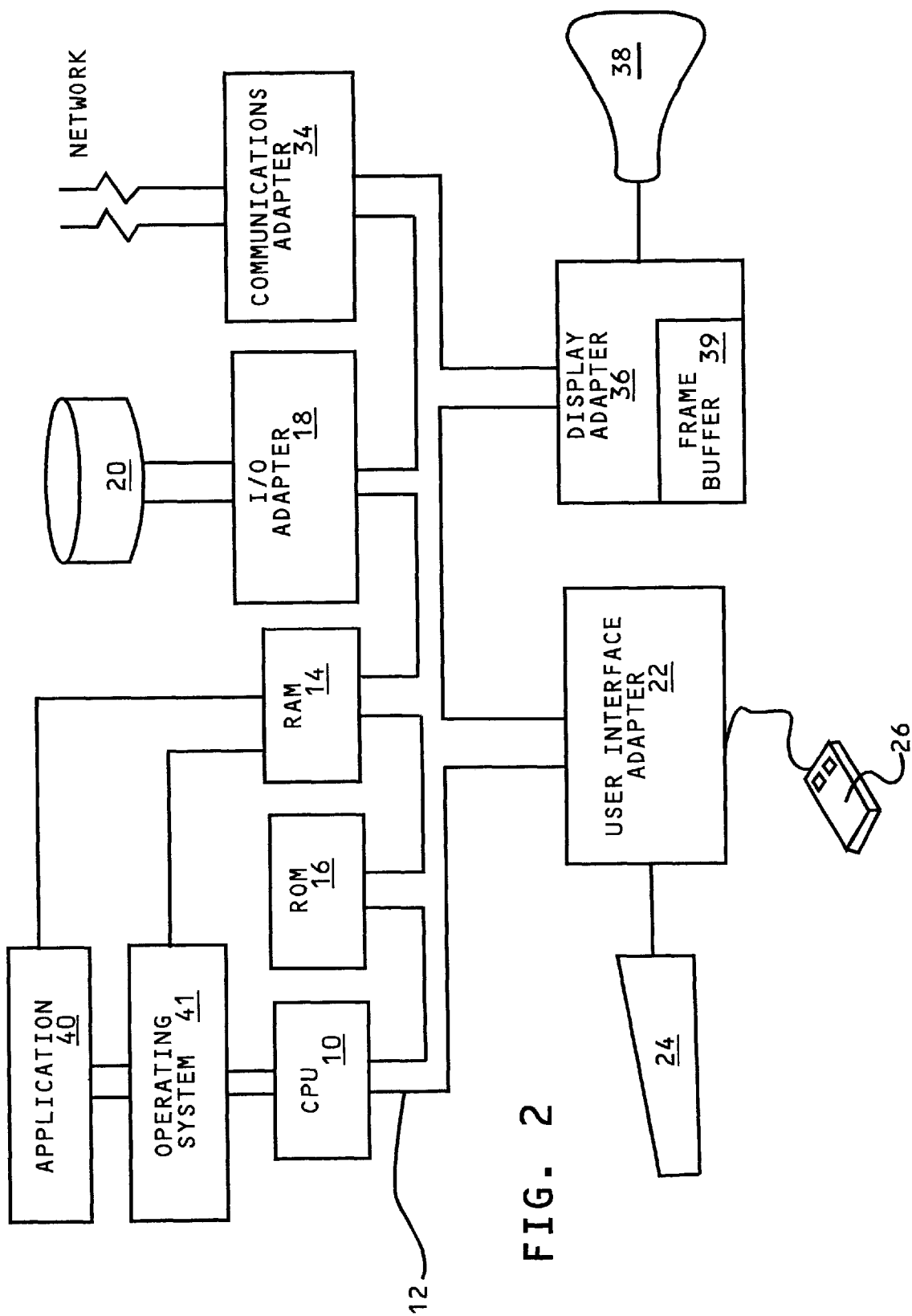
FIG. 2 is a block diagram of a data processing system including a central processing unit and network connections via a communications adapter which is capable of functioning both as a display computer for controlling an open Web site and as the server for comparing user requests to listed malicious user IP addresses.

Referring to FIG. 2, a typical data processing terminal is shown which may function as the computer control terminals for Web sites, computer control terminals at requesting user sites or the servers which connect requesting user sites or Web sites into the Web. A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 2. Operating system 41 may be one of the commercially available operating systems such as the AIX 6000™ operating system available from IBM; Microsoft's Windows 98™ or Windows NT™, as well as UNIX and AIX operating systems. Application programs 40, controlled by the system, are moved into and out of the main memory, random access memory (RAM) 14. These programs include the programs of the present invention for the protection of open Web sites at the server level and at the Web site level.

A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 communicates with the disk storage device 20. Communications adapter 34 interconnects bus 12 with an outside network enabling the data processing system to communicate, as respectively described above, through the Web or Internet. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
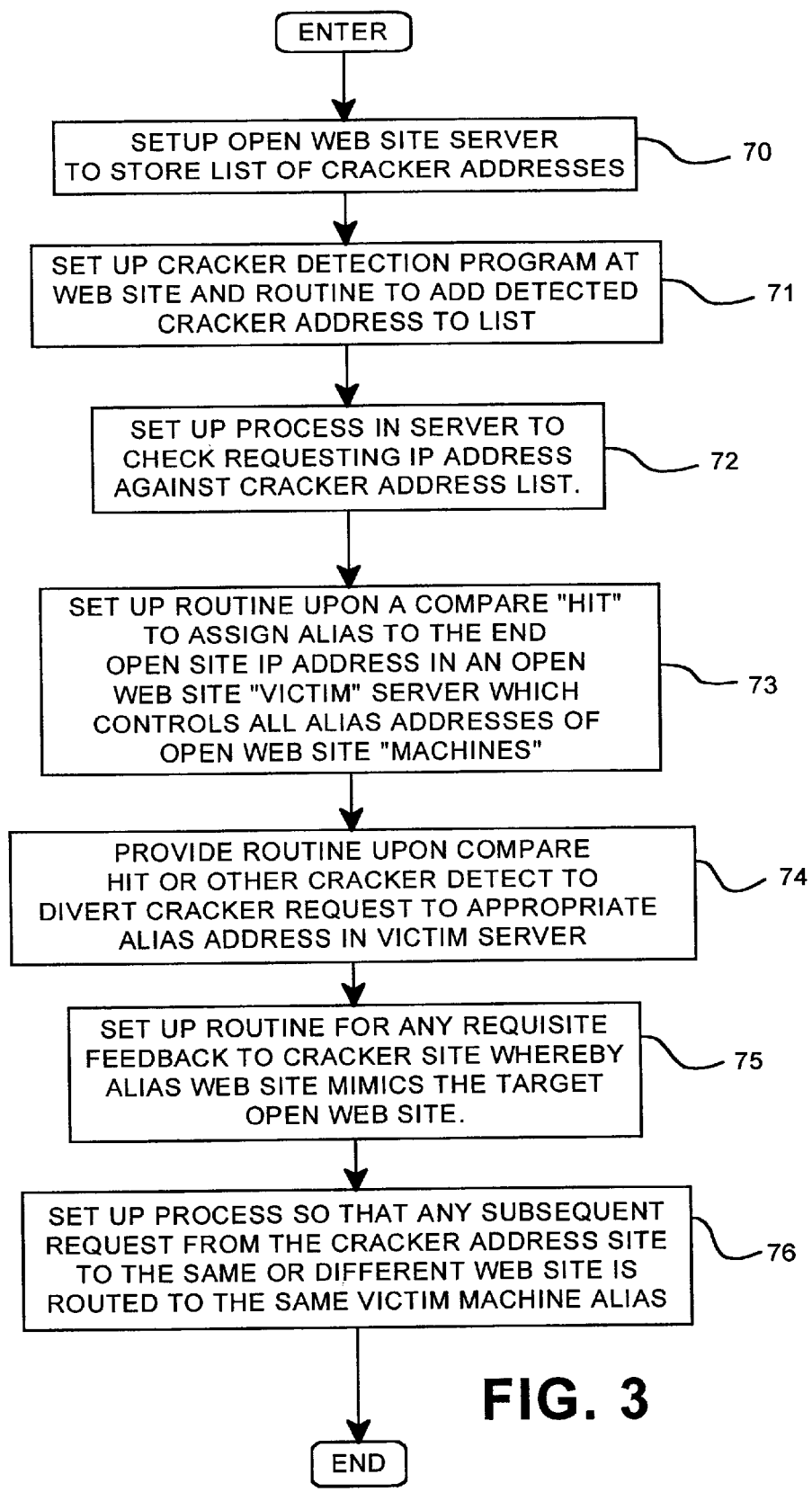
FIG. 3 is an illustrative flowchart describing the setting up of the elements of a program according to the present invention for protecting an open Web site from malicious requesting user IP addresses.

Now with reference to programming shown in FIG. 3, the program of the present invention is set up. There is set up at an open Web site or a group of such sites, so that the server for such sites is enabled to store a list of the IP addresses of crackers (known malicious users), step 70. A comparison process is set up in the server for checking the IP address of each requester against the list of known crackers, step 71. A routine is set up so that upon a compare "Hit", the Web site IP address is aliased to an alias address, step 72, and a routine is set up to divert the Hit request to the alias address set up in step 71. Appropriate routines are set up so that any required feedback to the requesting or cracker addresses will mimic the targeted open Web site, step 74. Finally, a process is set up, step 75, so that any subsequent request from the cracker IP address to the same or a different Web is routed to the same alias address assigned for the particular cracker IP address. This step covers a situation wherein, with reference to FIG. 1, if a malicious request to open site 54 from a given cracker has been aliased to Web site alias 57, then a subsequent request from the same cracker to open Web site 55 will also be aliased to Web site alias 57.

Now with reference to the flowchart of FIG. 4, a simplified illustrative run of the process set up in FIG. 3 will be described. First, step 80, a determination is made as to whether there has been a request to the open Web site. If No, the process is returned to step 80, and a request is awaited. If Yes, then there is comparison made to the cracker IP address list for the requester's address, step 81. If the determination made in step 82 is that No, the requester is not on the list, then the request is routed to the requested open Web site for processing, step 83. If the determination made in step 82 is Yes, there is a "hit" or compare to the cracker list then step 84, a further determination is made, step 84, as to whether an alias Web IP address has already been set up for the particular cracker. If No, a corresponding alias Web IP address site is set up, step 86, and the process proceeds to step 85 via branch "A". On the other hand, if the decision from step 84 is Yes, an alias Web IP address site has already been set up, then the process proceeds directly to step 85 where the cracker request is sent to the alias Web site address. Then, step 87, a determination is made as to whether any feedback to the cracker is required. If Yes, then feedback is sent to the requesting cracker which appears to be coming from the open Web site, step 89. Then, the process branches to step 88 via branch "B", which is also proceeded to directly if the decision from step 87 is No feedback is required. At this point, a determination is conveniently made as to whether the session is over, step 88. If Yes, the session is ended. If No, then the process branches back to step 80 where the next open Web site access request is awaited.

It should be noted that the programs covered by the present invention may be stored outside of the present computer systems until they are required. The program instructions may be stored in another readable medium, e.g. in disk drive associated with the desktop computer or in a removable memory, such as an optical disk for use in a CD ROM computer input, or in a floppy disk for use in a floppy disk drive computer input. Further, the program instructions may be stored in the memory of another computer prior to use in the system of the present invention and transmitted over a network when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web (Web) communication network with access to a plurality of open Web sites responsive to requests from users at IP addresses throughout the Webs, a system for protecting said open Web sites front known malicious users comprising;

means associated with a protected open Web site for storing a list of the IP addresses of said known malicious users;

means for comparing the IP addresses of each user requesting access to said protected open Web site to said list of IP addresses of said known malicious users;

means for providing a plurality of alias addresses for said protected Web site; and means responsive to said comparing means enabled to respectively divert to each of said plurality of alias addresses, one of a plurality of requests respectively from plurality of malicious users, whereby the request of each of said malicious users is diverted to a different one of said alias Web site addresses.

2. The network system of claim 1 further comprising:
    a server for said protected Web site including:
    said means for comparing,
    said means for providing said alias address, and
    said means for diverting.

3. The network system of claim 2 wherein said means for diverting further includes a router for routing all requests from said malicious users to a safe sub-network at said alias address.

4. The network system of claim 1 wherein said means associated with the protected open Web site for storing a list of the IP addresses of said known malicious users is associated with a plurality of protected Web sites.

5. The network system of claim 1 wherein said means associated with the protected open Web site for storing a list of the IP addresses of said known malicious users is associated with a plurality of protected web sites.

6. In a Web communication network with access to a plurality of open Web sites responsive to requests from users at IP addresses throughout the Web, a method for protecting said open Web sites from known malicious users comprising;

storing a list of the IP addresses of said known malicious users in association with a protected open Web site;

comparing the IP addresses of each user requesting access to said protected open Web site to said list of IP addresses of said known malicious users;

providing a plurality of alias addresses for said protected Web site; and in response to said comparing step, diverting to each of said plurality of alias addresses, one of a plurality of requests respectively from a corresponding one of a plurality of IP addresses of a plurality of malicious users, whereby the request of each of said malicious users is diverted to a different one of said alias Web site addresses.

7. The method of claim 6 wherein said step of storing a list of the IP addresses of said known malicious users is associated with a plurality of protected open Web sites.

8. A computer program having code recorded on a computer readable medium for protecting said open Web sites from known malicious users in a Web communication network with access to a plurality of open Web sites responsive to requests from users at IP addresses throughout the Web comprising:

means associated with a protected open Web site for storing a list of the IP addresses of said known malicious users;

means for comparing the IP addresses of each user requesting access to said protected open Web site to said list of IP addresses of said known malicious users;

means for providing a plurality of alias addresses for said protected Web site; and means responsive to said comparing means enabled to respectively divert to each of plurality of alias addresses, one of a plurality of requests respectively from a corresponding one of a plurality of IP addresses of a plurality of malicious users, whereby the request of each of said malicious users is diverted to a different one of said alias Web site addresses.

9. The computer program of claim 8 wherein said means associated with the protected open Web site for storing a list of the IP addresses of said known malicious users is associated with a plurality of protected Web sites.

10. A computer program having code recorded on a computer readable medium for protecting said open Web sites from known malicious users in a Web communication network with access to a plurality of open Web sites responsive to requests from users at IP addresses throughout the Web comprising:

means for determining whether a user requesting access to a protected open Web site is a malicious user;

means for providing a plurality of alias addresses for said protected Web site; and means responsive to said determining means enabled to respectively divert to each of said plurality of alias addresses, one of a plurality of requests respectively from a corresponding one of a plurality of IP addresses of a plurality of malicious users, whereby the request of each of said malicious users is diverted to a different one of said alias Web site addresses.

11. The computer program of claim 10 wherein said means for determining whether a user requesting access to said open Web site is a malicious user is associated with a plurality of protected Web sites.

12. A computer program having code recorded on a computer readable medium for protecting said open Web sites from known malicious users in a Web communication network with access to a plurality of open Web sites responsive to requests from users at IP addresses throughout the Web comprising:

means associated with a protected open Web site for storing a list of the IP addresses of said known malicious users;

means for comparing the IP addresses of each user requesting access to said protected open Web site to said list of IP addresses of said known malicious users;

means for providing a plurality of alias addresses for said protected Web site; and means responsive to said comparing means for diverting to each of said plurality of alias addresses, one of a plurality of requests respectively from a corresponding one of a plurality of IP addresses of a plurality of malicious users, whereby the request of each of said malicious users is diverted to a different one of said alias Web site addresses.

13. The computer program of claim 12 wherein said means associated with the protected open Web site for storing a list of the IP addresses of said known malicious users is associated with a plurality of protected web sites.

\* \* \* \* \*

UNITED STATES PATENT AND TRADEMARK OFFICE
CERTIFICATE OF CORRECTION

PATENT NO.   : 6,714,970 B1
DATED        : March 30, 2004
INVENTOR(S)  : Fiveash et al.

It is certified that error appears in the above-identified patent and that said Letters Patent is hereby corrected as shown below:

Column 5,
Line 50, after "from" please insert -- a corresponding one of a plurality of IP addresses of a --.

Signed and Sealed this

Twenty-eighth Day of September, 2004

JON W. DUDAS
*Director of the United States Patent and Trademark Office*